United States Patent Office 2,698,414
Patented Dec. 28, 1954

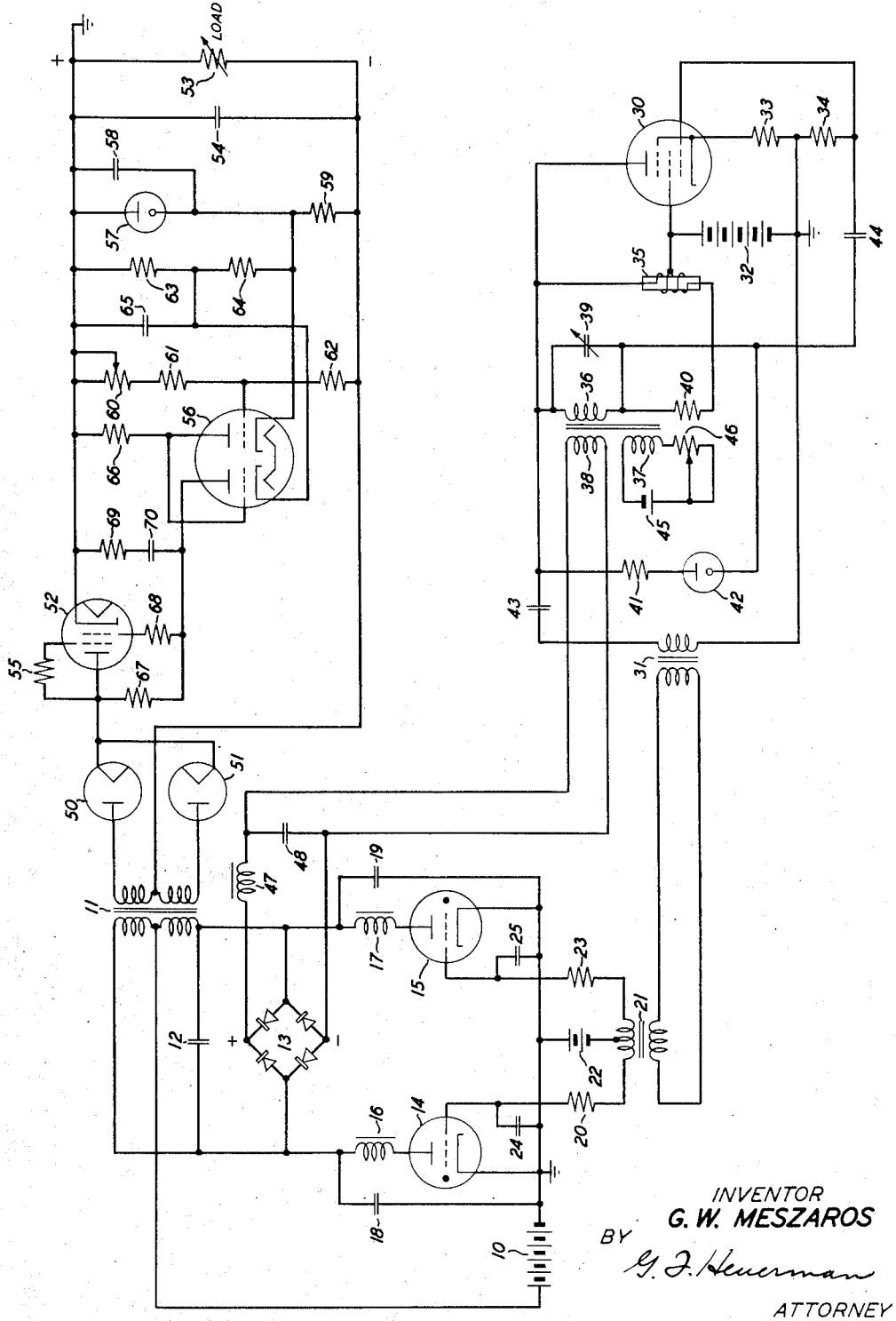

2,698,414

CURRENT SUPPLY APPARATUS

George W. Meszaros, New York, N. Y., assignor to Bell Telephone Laboratories, Incorporated, New York, N. Y., a corporation of New York Application March 5, 1952, Serial No. 274,902

4 Claims. (Cl. 321—2)

This invention relates to current supply apparatus and particularly to apparatus for regulating the supply of current to a load.

An object of the invention is to provide improved apparatus for regulating the supply of current to a load to maintain the load voltage substantially constant.

In a specific embodiment of the invention herein shown and described for the purpose of illustration, there are provided an inverter, energized from a direct current source, for producing an alternating output current and a circuit for rectifying the alternating current and for supplying the rectified current to a load. The inverter comprises a pair of gas-filled grid-controlled space current devices which are made conductive alternately by impressing upon the control circuits of the devices an alternating voltage derived from an oscillator having a variable tuned circuit. The tuning of the tuned circuit is varied under control of a direct current which is derived from the output of the inverter by means of an auxiliary rectifier. The frequency of the alternating voltage impressed upon the control circuit of the inverter is thus varied in response to inverter output voltage changes to cause the changes of inverter output voltage to be minimized. The load voltage changes, therefore, are also reduced. For further reducing the changes of load voltage, the space current path of a space current device is provided in the circuit for transmitting rectified current to the load and means are provided for controlling the resistance of the space current path in accordance with load voltage changes.

The single figure of the accompanying drawing is a schematic view of a current supply apparatus embodying the invention.

There is provided an inverter energized by current from the direct-current source 10 for producing an alternating voltage across an output circuit having three parallel branch paths, one comprising the primary winding of a transformer 11, a second branch path comprising a condenser 12 and the third branch path comprising the input circuit of a bridge rectifier 13. The inverter comprises two gas-filled space current devices 14 and 15 each having an anode, a cathode and a control electrode. The cathodes are connected to the grounded negative terminal of battery 10. The positive terminal of battery 10 is connected to mid-terminal of the primary of transformer 11. Space current is supplied from battery 10 through one half portion of the primary of transformer 11 and an inductor 16 to the space current path of tube 14 and through the other half portion of the primary of transformer 11 and an inductor 17 to the space current path of tube 15. A condenser 18 is provided in a path connecting a common terminal of the primary of transformer 11 and inductor 16 to ground and a condenser 19 is provided in a path connecting a common terminal of the primary of transformer 11 and inductor 17 to ground. The grid-cathode circuit of tube 14 comprises in series a resistor 20, one half portion of the secondary winding of a transformer 21 and a battery 22. The grid-cathode circuit of tube 15 comprises in series a resistor 23, the other half portion of the secondary of transformer 21 and battery 22. The battery 22 is poled to bias the grid of each tube negatively with respect to its cathode so as to prevent space current conduction in each tube in the absence of an alternating voltage impressed upon the primary of transformer 21. A condenser 24 is connected across the grid-cathode path of tube 14 and a condenser 25 is connected across the grid-cathode path of tube 15.

There is provided an oscillator comprising a space current device 30 having an anode, a cathode, a suppressor grid connected to the cathode, a screen grid and a control grid, for generating an alternating voltage which is impressed through an output transformer 31 upon the primary winding of transformer 21. This alternating voltage may have a frequency of about 400 cycles per second, for example. The cathode of tube 30 is connected through a resistor 33 to the grounded negative terminal of a battery 32 and the control grid is connected through a resistor 34 to ground. The positive terminal of battery 32 is connected directly to the screen grid to supply screen grid-cathode current to the tube. The positive battery terminal is connected through a portion of the winding of an inductor 35 to the anode to supply anode-cathode current to the tube 30. There is provided a saturable inductance device having three windings 36, 37 and 38, direct currents being supplied to windings 37 and 38 to control the impedance of winding 36. Winding 36 and an adjustable condenser 39 are connected in parallel to form a tuned circuit. Current from battery 32 is also supplied through the remaining portion of inductor 35, a resistor 40 and winding 36 to the anode-cathode circuit of tube 30. A current path comprising a resistor 41 and a cold cathode, gas-filled diode 42 is connected across the tuned circuit 36, 39 to limit the voltage thereacross. The tuned circuit 36, 39 is connected in a circuit comprising, in series, a condenser 43, the primary of transformer 31, resistor 34, and a condenser 44, the alternating voltage across resistor 34 being impressed upon the control grid-cathode circuit of tube 30. Current from a battery 45 is supplied through a rheostat 46 to winding 37 of the saturable reactor. Direct current from auxiliary rectifier 13, after being filtered by the series inductor 47 and shunt condenser 48, is supplied to the winding 38 of the saturable reactor.

If for some reason, such as an increase of the voltage of battery 10, the output voltage of the inverter should increase, for example, the current supplied to reactor winding 38 would increase. The magnetomotive forces set up in the core of the reactor by the current in windings 37 and 38 are opposed and the magnetomotive force due to winding 37 is larger than that due to winding 38. Therefore the saturation of the core decreases to cause the inductance of winding 36 to increase. The frequency of the voltage generated by the oscillator and impressed upon the grid-cathode circuits of tubes 14 and 15 is therefore reduced to cause a reduction of the output voltage of the inverter.

The output current of the inverter is supplied through a transformer 11 to a rectifier comprising diodes 50 and 51 and the rectified current is supplied through the space current path of a space current device 52 to a load 53, a filtering condenser 54 being connected across the load. The end terminals of the secondary of transformer 11 are connected to the anodes, respectively, of tubes 50 and 51, the cathodes of tubes 50 and 51 are connected to the anode of tube 52, the cathode of tube 52 is connected to the positive load terminal and the negative load terminal is connected to a mid-tap of the secondary of transformer 11. The screen grid of tube 52 is connected through a resistor 55 to the cathodes of rectifier tubes 50 and 51.

There is provided a circuit comprising a twin-triode tube 56 for amplifying load voltage changes to set up a control voltage which is impressed upon the control grid-cathode circuit of tube 52 to control the resistance of the space current path of tube 52 and thereby control the current supplied to the load 53. Load voltage changes due to residual output voltage changes of the inverter which were not eliminated by the compensating means for the inverter or due to some other cause are thus minimized.

There are connected across the load a first current path comprising a cold cathode, gas-filled constant voltage tube 57, shunted by a condenser 58, and in series therewith a resistor 59 and a second current path comprising a rheostat 60, and resistors 61 and 62, all in series.

A voltage divider comprising resistors 63 and 64 is connected across the constant voltage tube 57, a condenser 65 being connected across resistor 63. The control grid of the right-hand triode of tube 56 is connected to the common terminal of resistors 61 and 62, its cathode is connected to a common terminal of cold cathode tube 57 and resistor 59 and its anode is connected through a resistor 66 to the positive load terminal. There is thus impressed upon the grid-cathode circuit of this triode a voltage equal to the difference of that portion of the load voltage appearing across resistors 60 and 61 and the constant voltage across tube 57. The resulting amplified load voltage variations appearing across resistor 66 are impressed upon the control grid-cathode circuit of the left-hand triode of tube 56 in series with the constant biasing voltage across resistor 63. The anode of the left-hand triode is connected through a resistor 67 to the cathodes of rectifier tubes 50 and 51 and through a resistor 68 to the control grid of tube 52. The further amplified load voltage variations appearing across resistor 67 are thus impressed upon the control grid-cathode circuit of tube 52. A current path comprising a resistor 69 and a condenser 70 is connected between the cathode of tube 52 and a common terminal of resistor 68 and the anode of the left-hand triode of tube 56.

An increase of voltage across the load, for example, will result in the grid of the right-hand triode of tube 56 being made relatively more negative with respect to its cathode. The control grid of the left-hand triode of tube 56 is thus made relatively more positive with respect to its cathode and the control grid of tube 52 is made relatively more negative with respect to its cathode. The resistance of the anode-cathode path of tube 52 thus increases to cause the assumed rise of load voltage to be minimized. It is thus seen that the two compensating or regulating devices cooperate to maintain the load voltage substantially constant. If, for example, the output voltage of the inverter should rise to cause the load voltage to increase, the increased current supplied to reactor winding 38 acts to minimize the rise of output voltage of the inverted and therefore the rise of load voltage. The rise of load voltage causes the anode-cathode resistance tof tube 52 to increase, thereby further minimizing the assumed increase of load voltage.

What is claimed is:

1. In combination, alternating-current generating means having an output, means comprising a first rectifier for rectifying current supplied by said generating means to said output and for supplying the rectified current to a load, a second rectifier for rectifying current supplied by said generating means to said output, means responsive to rectified current supplied by said second rectifier for controlling said generating means to minimize voltage changes across said output of said generating means and thereby reduce voltage changes across said load, and means responsive to voltage changes across said load for further reducing said load voltage changes.

2. In combination, an inverter for supplying alternating current to an output circuit, said inverter comprising a pair of gas-filled space current devices each having an anode, a cathode and a control electrode, a rectifier for rectifying current supplied thereto from said output circuit, an oscillator comprising a tuned circuit for generating an alternating voltage, means responsive to the rectified current from said rectifier to control the tuning of said tuned circuit for varying the frequency of the voltage generated by said oscillator, and means for impressing said alternating voltage from said oscillator upon circuits connecting the control electrode and cathode of said space current devices to control the voltage across the output circuit of said inverter.

3. In combination, an inverter having an output circuit, means for energizing said inverter by current from a direct-current source, a source of alternating voltage, means for impressing an alternating voltage from said source upon said inverter for causing said inverter to supply alternating current to its output circuit, means for rectifying and supplying to a load current from said inverter output circuit, a second means for rectifying current from said inverter output circuit, means responsive to rectified current from said second rectifying means for controlling the frequency of the alternating voltage of said source to thereby minimize voltage changes across said load, and means responsive to voltage changes across said load for further minimizing said load voltage changes.

4. In combination, an inverter comprising an output circuit and a first and a second space current device each having an anode, a cathode and a control grid, a source of direct current for energizing said inverter, a saturable reactor having a first and a second winding, means for generating an alternating voltage, a tuned circuit comprising said first reactor winding for determining the frequency of said alternating voltage, means for impressing an alternating voltage from said generating means upon circuits connecting the control grid and cathode of said first and second space current devices, respectively, for causing the initiation of conduction in said space current devices alternately, thereby generating an alternating current in the output circuit of said inverter, a first rectifier for rectifying current from said inverted output circuit, means comprising a third space current device for supplying rectified current from said first rectifier to a load through the space current path of said third space current device, said third space current device having an anode, a cathode and a control electrode, a second rectifier for rectifying current from said inverter output circuit, means for reducing voltage changes across said load comprising means for supplying rectified current from said second rectifier to said second winding of said saturable reactor to control the tuning of said tuned circuit, and means responsive to load voltage changes for controlling the potential of the control electrode with respect to the cathode of said third space current device to further reduce said load voltage changes.

References Cited in the file of this patent

UNITED STATES PATENTS

| Number | Name | Date |
|---|---|---|
| 2,272,794 | Kramolin | Feb. 10, 1942 |
| 2,299,942 | Trevor | Oct. 27, 1942 |
| 2,386,548 | Fogel | Oct. 9, 1945 |
| 2,485,652 | Parker | Oct. 25, 1949 |
| 2,497,182 | Miller | Feb. 14, 1950 |
| 2,547,162 | Kidd | Apr. 3, 1951 |
| 2,549,782 | Engelman | Apr. 24, 1951 |
| 2,565,621 | Olson | Aug. 28, 1951 |